United States Patent [19]

Urschel et al.

[11] 4,094,336

[45] June 13, 1978

[54] BACK DRAFT FOR EXHAUST FANS AND HOODS

[76] Inventors: John N. Urschel, 3102 N. 46th Pl., Phoenix, Ariz. 85034; Robert P. Urschel, 727 Solano Dr., Tempe, Ariz. 85281; Fred P. Urschel, 5302 N. Woodmere Fwy., Scottsdale, Ariz. 85253

[21] Appl. No.: 788,807

[22] Filed: Apr. 19, 1977

[51] Int. Cl.² ............................................. F16K 15/03
[52] U.S. Cl. .................................................. 137/512.1
[58] Field of Search ........................ 98/119; 137/512.1

[56] References Cited

U.S. PATENT DOCUMENTS

| | | | |
|---|---|---|---|
| 3,009,475 | 11/1961 | Richterkessing | 137/512.1 |
| 3,171,343 | 3/1965 | Wexler | 98/119 |
| 3,445,863 | 5/1969 | Wada | 137/512.1 X |

Primary Examiner—Robert G. Nilson
Attorney, Agent, or Firm—Don J. Flickinger; John A. Robertson; William H. Dean

[57] ABSTRACT

A back draft damper for exhaust fans and hoods such as those used in kitchens or bathrooms; the damper comprising a stationary valve plate having a pair of openings and an elongate slot between said openings with a pair of flapper valve plates having curved edge portions extending through said slot and forming pivotal mounting for said flapper valve plates on said stationary valve plate; said flapper valve plates having extremities overlapping said openings in said stationary valve plate; the flapper valve plates being openable by air under pressure and closeable by gravity, and being on an upper surface of said stationary valve plate.

12 Claims, 3 Drawing Figures

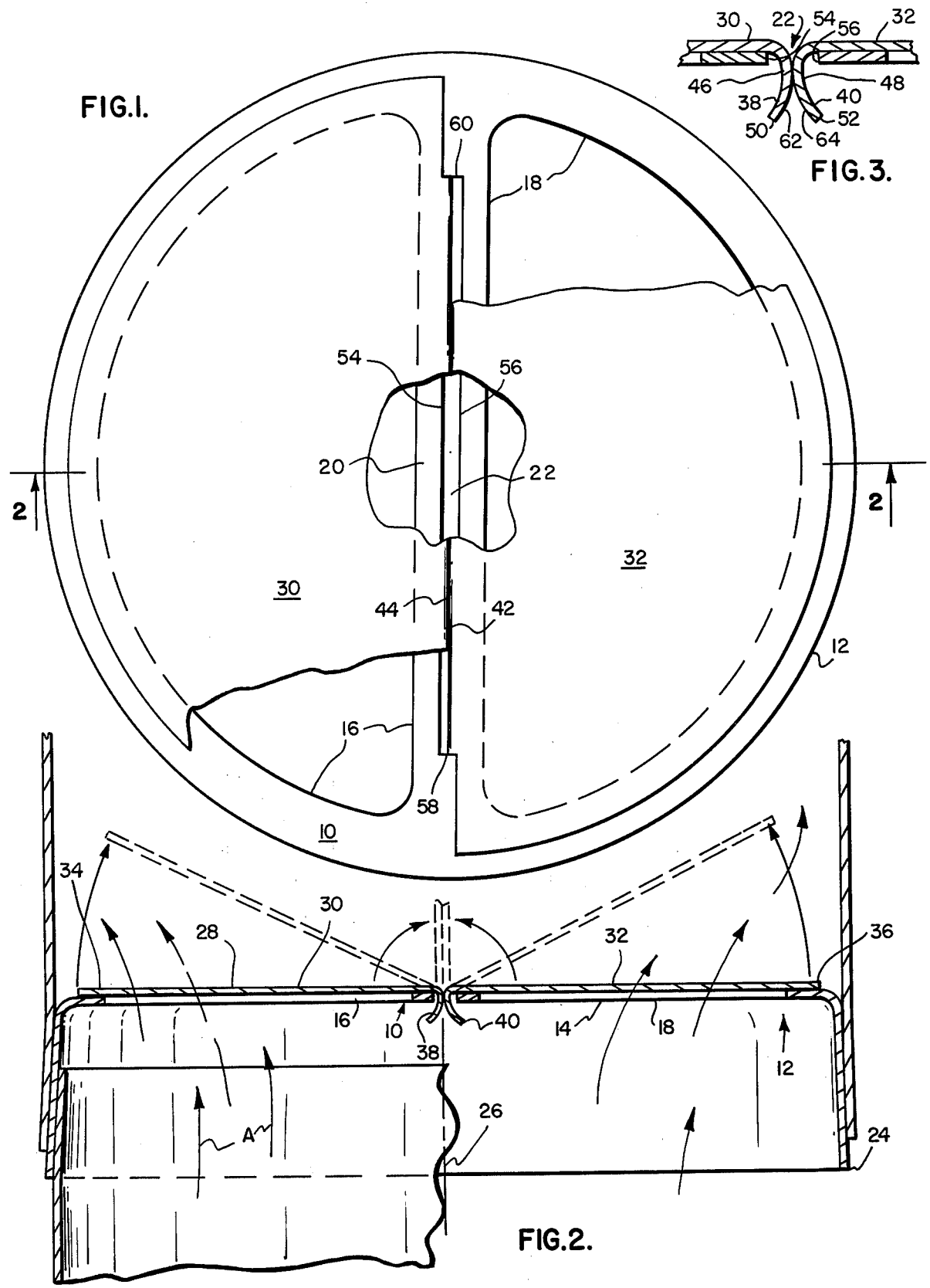

BACK DRAFT FOR EXHAUST FANS AND HOODS

BACKGROUND OF THE INVENTION

Various back draft dampers have been used at the outlet of exhaust fans, normally operable to exhaust air from kitchen or bathroom areas, and these back draft dampers are usually light weight flapper valves which open in response to pressure of air from an exhaust fan and close by gravity when the air pressure from the exhaust fan is shut off. The conventional back draft dampers are designed to prevent air from flowing through the area of an exhaust fan and to an area outside of a building room and also disposed and adapted to prevent air flow from the outside into the room. These back draft dampers are generally simple check valve mechanisms.

SUMMARY OF THE INVENTION

The back draft damper of the present invention is particularly adapted for use at the outlets of exhaust fans and hoods such as found in kitchens for exhausting fumes over a stove or for use in bathrooms for exhausting air from the interior of the bathroom to the outside atmosphere. The back draft damper of the invention is a generally pan shaped structure having a stationary valve plate which is flat and circular and provided with an annular skirt disposed substantially at right angles to the flat plane of the stationary valve plate. The annular skirt, however, has a central axis and the aforementioned skirt is provided with an open edge and this edge is determinous of a generally circular wall, which is slightly conocally tapered in a direction from said edge to the aforementioned flat stationary valve plate portion of the damper. The flat valve plate portion is provided with a pair of generally semi-circular openings therein between which the plate is provided with a bar portion extending diametrically across the generally circular stationary valve plate and this bar portion is provided with a slot extending therethrough wherein generally hook shaped curved edges of a pair of flapper valve plates are disposed. These flapper valve plates, at their hook shaped curved edge portions, are generally concavo convex and the convex portions of the curved edge portions of the pair of plates are adjacent each other, and the concave portions are adjacent the opposite sides of the slot in the generally diametrical bar portion of the stationary valve plate. The flapper valve plates are flat and have peripheral portions overlapping the generally semi-circular openings in the stationary valve plate, and the aforementioned curved edge portions extend downwardly and the flapper valve plates rest by reason of gravitational attraction on the upper side of the stationary valve plate over said openings. The semi-circular openings serve as vent openings through which air may pass and force the flapper valve plate upwardly into generally open position, since these flapper valve plates are a very light weight material, such as thin aluminum. As for example, these plates may be .015 inches thick and are therefore very light weight and responsive to upward pressure of air for opening them relative to the openings in the stationary valve plate and allowing air to flow upwardly thereunder and therearound. The aforementioned curved edge portions of the flapper valve plates are freely pivotally moveable in said slot of said bar portion of said stationary valve plate and the edge portions are provided with terminal edges which, when in said slot, diverge away from each other in a downward direction and are spaced slightly farther apart than the width of said slot so as to retain the curved edge portions therein. The cross section of the concavo convex curved edge portions of the flapper valve plates are disposed relative to the flat plane of said plates such that a line drawn cordally through the concavo convex portions may be at substantially right angles to the plane of the flapper valve plates or the flat plane of the stationary valve plate when the flapper valve plates are in closed position relative thereto. The stationary valve plate is mounted in connection with a tubular outlet of an exhaust fan simply by placing the tapered portion of the skirt over a like portion of the outlet of the exhaust fan and placing a vent pipe over the outer side of the skirt of said stationary valve plate so as to hold the skirt of the back draft damper of the invention in a frusto conical relation between an outlet pipe of an exhaust fan and an exhaust tube which is disposed to carry exhaust gasses or air from the back draft damper area to an area outside a building room.

Accordingly, it is an object of the invention to provide a back draft damper for exhaust fans and hoods which is very simple and economical of construction, very reliable and extremely articulate due to the light weight construction thereof.

Another object of the invention is to provide a back draft damper which is readily and easily installed in connection with exhaust fans or hoods and respective vent pipes.

Another object of the invention is to provide a novel construction of a back draft damper which is made of only three parts, namely a stationary valve plate and two generally semi-circular flapper valve plates where the valve plates are provided with simple curved edges which extend through a slot in a diametrically disposed bar portion which is located between a pair of outlet openings in the stationary valve plate.

Another object of the invention is to provide a back draft damper which is made of very light weight material such that the flapper valve portions thereof are very responsive.

Further objects and advantages of the invention may be apparent from the following specification, appended claims and accompanying drawings.

BRIEF DESCRIPTION OF THE DRAWINGS

FIG. 1 is a top of plan view of the back draft damper of the invention, showing portions thereof fragmentarily and broken away to amplify the illustration;

FIG. 2 is a fragmentary sectional view taken from the line 2—2 of FIG. 1, showing an exhaust fan outlet and a vent pipe in connection with the skirt of the stationary valve plate of the back draft damper and showing by broken lines varying positions of the flapper valve plates and illustrating by arrows the flow of air therearound; and FIG. 3 is an enlarged sectional view of curved hinge portions of the flapper valve plates of the invention in a slot in a bar portion of the stationary valve plate.

DESCRIPTION OF THE PREFERRED EMBODIMENTS

The back draft damper of the invention is provided with a stationary valve plate 10 having an annular tapered skirt portion 12. This skirt portion is circular as shown in FIG. 1 of the drawings and its side wall extends substantially at right angles to a flat plate portion 14 of the stationary valve plate 10.

The stationary valve plate 10 is provided with a pair of generally semi-circular openings 16 and 18 therein. These openings 16 and 18 are in the top plate portion 10, which is a substantially flat planer structure, and these openings 16 and 18 are disposed at opposite sides of a diametrically disposed bar portion 20 which is provided with a slot 22 therein; this slot being elongated and also extending diametrically and intersecting a center of the annular skirt or wall 12. The skirt 12 is provided with an open edge portion 24 and a central axis 26 which intersects the center of the slot 22, as will be hereinafter described in detail.

Pivotally mounted on the upper side 28 of the horizontal flat plate portion 10 are a pair of flapper valve plates 30 and 32 which cover the openings 16 and 18 respectively; the flapper valve plates 30 and 32 have peripheral portions 34 and 36 which overlap the extremeties of the semi-circular opening 16, all as shown best in FIGS. 1 and 2 of the drawings. The flat plane of the flat portion 10 of the stationary valve plate is intimately engaged by the flat surfaces of the flapper valve plates 30 and 32, thus forming a substantially good seal around the openings 16 and 18.

The flapper valve plates 30 and 32 are provided with curved edge portions 38 and 40 respectively, which are shown in detail in FIG. 3 of the drawings.

These curved edge portions 38 and 40 are disposed along relatively straight edges 42 and 44 of the flapper valve plates 30 and 32, these being convex surfaces. As shown in FIG. 3 of the drawings, the curved edge portions 38 and 40 are concavo convex portions having concave sides 46 and 48 respectively and these curved edge portions 38 and 40 have terminal edges 50 and 52 which are extended apart a distance slightly greater than the width of the slot 22 between its opposite sides 54 and 56. The curved edge portions 38 and 40 are freely pivotally moveable in the slot 22 and the flapper valve plates 30 and 32 are very thin aluminum or other suitable light weight material. As for example, when made of aluminum, these flapper valve plates 30 and 32 may be 0.015 inches thick, so that they are readily responsive to the pressure of air flow as indicated by arrows A in FIG. 2 of the drawings, or raising the flapper valve plates to the broken line position shown in FIG. 2 and on upward to positions where the flapper valve plates 30 and 32 are almost vertically disposed. Thus, the air is able to pass outward and upward through the openings 16 and 18, as hereinbefore described.

The slot 22 is provided with opposite ends 58 and 60 and the curved edge portions 38 and 40 are provided with opposite ends which substantially coincide with the ends 58 and 60 of the slot 22.

The flapper valve plates 30 and 32 may be readily installed in connection with the stationary valve plate 10 by hooking the curved edge portions 38 and 40 through the slot 22 between its opposite sides 54 and 56, and this mays be done progressively by placing the edge portions 38 and 40 successively in the slot 22.

The curved edge portion 38 is provided with a convex surface 62 opposite to the concave surface 38 and the curved edge portion 40 of the valve plate 32 is provided with a convex surface 64 opposed to the concave surface 48 and, it will be seen that the convex surfaces 62 and 64 of the curved edge portions 38 and 40 of the respective flapper valve plates 30 and 32 are readily and easily pivotal relative to each other such that the curved convex surfaces 62 and 64 actually tend to roll against each other as the flapper valve plates 30 and 32 are moved upward into the broken line positions by air pressure, as hereinbefore described in connection with the arrows A. Thus, the convex surfaces 62 and 64 serve as rolling surfaces against each other, allowing the flapper valve plates 30 and 32 to move upwardly with a minimum of friction.

It will be obvious to those skilled in the art that various modifications may be resorted to without departing from the spirit of the invention.

We claim:

1. A back draft damper for exhaust fans and hoods comprising: a generally stationary valve plate having a pair of openings therein; said plate having a bar portion extending across said plate between said openings; said bar portion having an elongate slot therein; said slot having opposite sides; a pair of flapper valve plates having curved edge portions disposed in said slot; said flapper valve plates having overlapping portions while overlap the extremeties of respective ones of said openings; said flapper valve plates, at said curved edge portions, being freely pivotally moveable in said slot.

2. The invention as defined in claim 1, wherein: said slot having opposite ends; said curved edges of said flapper valve plates having opposite ends disposed in close proximity to said opposite ends of said slot.

3. The invention as defined in claim 2, wherein: said stationary valve plate is flat; said flapper valve plates being flat and intimately engaging said stationary valve plate around said openings; said overlapping portions of said flapper valve plates extending beyond respective ends of said curved edges.

4. The invention as defined in claim 2, wherein: said overlapping portions of said flapper valve plates extending beyond said opposite ends of said curved portions of said flapper valve plates.

5. The invention as defined in claim 1, wherein: said stationary valve plate is flat; said flapper valve plates being flat and intimately engaging said stationary valve plate in overlapping relationship to and around said openings therein.

6. The invention as defined in claim 1, wherein: said curved edges being concavo convex in cross section; each curved edge having a concave surface adjacent a respective one of said opposite sides of said slot; each curved edge having a convex surface; said curved edges of one of said flapper valve plates having a convex surface which is opposed to and substantially contiguous with a like convex surface of the other of said flapper valve plates; said flapper valve plates having substantially flat opposite sides; said flapper valve plates being on a substantially common plane relative to each other; said curved edge portions of said flapper valve plates each extending laterally relative to said plane such that a line extending cordally through said concavo convex cross section may be disposed at substantially right angles to said flat opposite sides of each respective flapper valve plate.

7. The invention as defined in claim 1, wherein: said stationary valve plate having upper and lower sides; said flapper valve plates resting on said upper side of said stationary valve plate; said curved edge portions of said flapper valve plates extending through said slot and downwardly below said lower side of said stationary valve plate; said edge portions of said flapper valve plates having lower terminal edges; said curved edges portions adjacent said terminal edges diverging downwardly away from each other when said flapper valves plates are in closed position relative to said stationary valve plates; said terminal edges, when in said position, being spaced apart a distance slightly greater than the distance between opposite sides of said slot.

8. The invention as defined in claim 1, wherein: said stationary valve plate is provided with upper and lower sides; said flapper valve plates being held by gravity in closed position against said upper side of said stationary valve plate and thereby covering said openings in said stationary valve plate.

9. The invention as defined in claim 8, wherein: said flapper valve plates are of thin light weight material such as to be elevatable by a draft of air passing through said openings in said stationary valve plate.

10. A back draft damper for exhaust fans and hoods comprising: a generally stationary circular valve plate having a center and a pair of openings therein; said plate having a bar portion diametrically disposed and extending across said plate between said openings; said bar portion intersecting the center of said plate; said bar portion being disposed between said openings; said bar portion having an elongated slot; said slot having opposite sides therein; said slot intersecting said center; a pair of flapper valve plates having curved edge portions disposed in said slot; said flapper valve plate having overlapping portions which overlap the extremeties of respective ones of said openings in said stationary valve plate; said flapper valve plates at said curved edge portions being freely pivotally moveable in said slot; said openings in said stationary valve plate being substantially semi-circular and disposed at opposite sides of said bar portion.

11. The invention as defined in claim 10, wherein: said stationary valve plate having an annular skirt which is tapered convergingly toward said portion of said plate wherein said openings are disposed.

12. A back draft damper for exhaust fans and hoods comprising: a generally stationary circular valve plate having a center and a pair of openings therein; said plate having a bar portion extending diametrically thereacross and between said openings; said bar portion diametrically disposed to intersect the center of said bar portion being disposed between said openings; said bar portion having an elongated slot therein; said slot having opposite sides; said slot intersecting said center; a pair of flapper valve plates having curved edge portions disposed in said slot; said flapper valve plates having overlapping portions which overlap the extremeties of respective ones of said openings; said flapper valve plates, at said curved edge portions, being freely pivotally moveable in said slot.

* * * * *

UNITED STATES PATENT OFFICE
CERTIFICATE OF CORRECTION

Patent No. 4,094,336                Dated June 13, 1978

Inventor(s) John N. Urschel et al.

It is certified that error appears in the above-identified patent and that said Letters Patent are hereby corrected as shown below:

On the cover page, Item [54] should read:

--- Back draft damper for exhaust fans and hoods ---.

Signed and Sealed this

Thirtieth Day of January 1979

[SEAL]

Attest:

RUTH C. MASON  
Attesting Officer

DONALD W. BANNER  
Commissioner of Patents and Trademarks